United States Patent
Lefaudeux et al.

(10) Patent No.: US 12,495,963 B2
(45) Date of Patent: Dec. 16, 2025

(54) METHODS AND SYSTEMS FOR INSPECTING THE ALIGNMENT OF THE EYE IN AN OPHTHALMOLOGICAL IMAGING APPARATUS

(71) Applicant: Imagine Eyes, Orsay (FR)

(72) Inventors: Nicolas Lefaudeux, Forges-les-Bains (FR); Xavier Levecq, Gif sur Yvette (FR)

(73) Assignee: Imagine Eyes, Orsay (FR)

( * ) Notice: Subject to any disclaimer, the term of this patent is extended or adjusted under 35 U.S.C. 154(b) by 725 days.

(21) Appl. No.: 17/759,678

(22) PCT Filed: Feb. 2, 2021

(86) PCT No.: PCT/EP2021/052441
§ 371 (c)(1),
(2) Date: Feb. 6, 2023

(87) PCT Pub. No.: WO2021/156259
PCT Pub. Date: Aug. 12, 2021

(65) Prior Publication Data
US 2023/0172449 A1    Jun. 8, 2023

(30) Foreign Application Priority Data
Feb. 3, 2020 (FR) .................................. 2001067

(51) Int. Cl.
*A61B 3/15* (2006.01)
(52) U.S. Cl.
CPC .............. *A61B 3/152* (2013.01); *A61B 3/158* (2013.01)
(58) Field of Classification Search
CPC .................................. A61B 3/152; A61B 3/158
(Continued)

(56) References Cited

U.S. PATENT DOCUMENTS 5,889,576 A * 3/1999 Fujieda .................. A61B 3/152
                                                                         351/208
9,213,163 B2   12/2015 Lewis et al.
(Continued)

FOREIGN PATENT DOCUMENTS

EP      2281500 A1    2/2011
EP      3305176 A1    4/2018

OTHER PUBLICATIONS

International Search Report issued in PCT/EP2021/052441 on Jun. 15, 2021 (3 pages).
(Continued)

*Primary Examiner* — Sharrief I Broome
(74) *Attorney, Agent, or Firm* — Osha Bergman Watanabe & Burton LLP

(57) ABSTRACT

A method for controlling alignment of an eye in an ophthalmological imaging device that includes a formation, on a two-dimensional detection plane, of an image of an element located in a plane of the pupil of the eye using an imaging optical element. The method further includes a determination of a lateral position of the pupil of the eye with respect to a point of origin of a reference frame of an imaging system in the eye space based on the position of the image in the detection plane. The method further includes an analysis of a state of focus of the image in two regions of the detection plane. The method further includes a determination of an axial position of the pupil of the eye with respect to the point of origin of the reference frame based on the analysis of the state of focus.

13 Claims, 5 Drawing Sheets

(58) Field of Classification Search
USPC ......................................................... 351/206
See application file for complete search history.

(56) References Cited

U.S. PATENT DOCUMENTS

| | | |
|---|---|---|
| 10,369,053 B2 | 8/2019 | Srinivasan et al. |
| 2007/0159599 A1* | 7/2007 | Yamada ................. A61B 3/113 351/211 |
| 2013/0050642 A1* | 2/2013 | Lewis .................... A61B 3/113 351/204 |
| 2016/0095752 A1* | 4/2016 | Srinivasan .......... A61F 9/00834 606/6 |

OTHER PUBLICATIONS

Written Opinion of the International Searching Authority issued in PCT/EP2021/052441 on Jun. 15, 2021 (4 pages).

International Preliminary Report on Patentability from PCT/EP2021/052441 on Jul. 28, 2022 (11 pages).

Applegate, R.A. et al.; "Importance of fixation, pupil center, and reference axis in ocular wavefront sensing, videokeratography, and retinal image quality"; J Cataract Refract Surg., vol. 35, No. 1, Jan. 2009, pp. 139-152 (36 pages).

* cited by examiner

METHODS AND SYSTEMS FOR INSPECTING THE ALIGNMENT OF THE EYE IN AN OPHTHALMOLOGICAL IMAGING APPARATUS

TECHNICAL FIELD OF THE INVENTION

The present description relates to methods and systems for controlling alignment of the eye in an ophthalmological imaging device and more precisely relates to controlling the position of the pupil of the eye in a reference frame of a system of imaging of said device.

PRIOR ART

Examples of ophthalmological imaging devices comprise OCT devices (OCT being the abbreviation of Optical Coherence Tomography) for capturing tomographic images of anterior segments (e.g. cornea) or posterior segments (e.g. retina) of the eye, fundus cameras, scanning laser ophthalmoscopes (SLOs) for capturing images of the fundus by scanning a laser beam using a confocal optical system, slit lamp microscopes, etc. In all these imaging devices, it is necessary to control the alignment of the eye, because involuntary movements of the eye lead to the pupil of the eye shifting with respect to the imaging system and thus to deficiencies in the formation of the images.

Various aligning systems are known that make it possible to ensure, for example, that the pupil of the eye and the entrance pupil of the imaging system are superposed, both laterally and axially.

For example, it is common knowledge that an eye-aligning system may comprise alignment sources coupled to a camera for viewing the eye. The alignment sources are imaged in reflection from the corneal dioptric interface of the eye, to form virtual secondary sources. By observing the position of the images of the secondary sources by means of the camera for viewing the eye, it is possible to carry out lateral centering of the pupil of the eye with respect to the entrance pupil of the imaging system of the ophthalmological imaging device. Axial centering, i.e. centering along an optical axis of the imaging system, is carried out manually by an operator.

Other aligning systems are known that allow, in addition to control of lateral centering, automatic control of axial centering.

Published patent application EP2281500 for example describes an aligning system with two cameras, allowing, via triangular measurements, both the lateral centering and axial centering of the pupil of the eye to be controlled. However, such an aligning system is bulkier and more complex to employ.

Granted U.S. Pat. No. 5,889,576 describes an ophthalmological device comprising measuring means that use reflection of a flux of light projected into the eye through the pupil and means for controlling the lateral and axial alignment of the position of the pupil of the eye. More precisely, the alignment-controlling means comprise means for imaging the anterior part of the eye, means for projecting alignment targets to finite distance in the eye space and alignment targets to infinite distance and means for detecting the targets. The alignment targets are reflected from the cornea of the eye and imaged by the means for imaging the anterior part of the eye. Axial alignment is controlled by comparing the distance between the images of the targets projected to infinite distance and the distance between the images of the targets projected to finite distance. Such a system in particular requires collimators for projecting the targets to infinite distance to be provided, this increasing the bulk of the device.

The present description describes alignment-controlling systems and methods that allow the lateral and axial centering of the pupil of the eye to be controlled, without addition of extra optical elements. It is thus possible, without increasing the complexity or bulk of the aligning system, to keep in superposition, during an ophthalmological examination, the center of the pupil of the eye and a point of origin of a reference frame of the imaging system of the ophthalmological imaging device, despite eye movements.

SUMMARY OF THE INVENTION

In this description, the term "comprise" means the same as "include" or "contain", and is inclusive or open-ended and does not exclude the presence of other elements that are not described or shown.

Furthermore, in the present description, the term "about" or "substantially" is synonymous with (means the same as) to within plus or minus 10%, or for example 5%, of the respective value.

According to a first aspect, the present description relates to a method for controlling alignment of the eye in an ophthalmological imaging device, said device comprising an imaging system with a given optical axis.

The method according to the first aspect comprises:

formation, on a two-dimensional detection plane, of at least one image of at least one element located in a plane of the pupil of the eye, by means of an imaging optical element having a given optical axis, said detection plane being inclined such that a normal to the detection plane makes a non-zero angle to said optical axis of the imaging optical element;

determination of a lateral position of the pupil of the eye with respect to a point of origin of a reference frame of the imaging system in the eye space, on the basis of the position of said at least one image in said detection plane;

analyze a state of focus of said at least one image in at least two regions of the detection plane, said regions being arranged in a direction of sharpness variation defined by the intersection of the detection plane with a plane formed by a normal to the detection plane and said optical axis of the imaging optical element;

determine an axial position of the pupil of the eye with respect to said point of origin of the reference frame of the imaging system, on the basis of said analysis of the state of focus.

In the context of the present description, an optical axis of the imaging system is defined by a line passing substantially through the center of a pupil of said imaging system and the center of an object field of the imaging system. This line may be a broken line if the imaging device contains beam-steering mirrors or other elements that deflect light. A pupil of the imaging system may be defined by a physical diaphragm of the optical system, or indeed, in the case of a scanning imaging system comprising one or more scanning mirrors, a pupil of the imaging system may be defined by one of said scanning mirrors or by the physical size of a scanning beam between two mirrors.

An entrance pupil of the imaging system is an optically conjugate pupil of the pupil of the imaging system, in the object space of the optical system, i.e. in the eye space.

In the present description, a direction collinear to the optical axis of the imaging system, considered in a given space, is generally called an "axial direction" in said space, and a position measured in an axial direction is generally called an "axial position".

A direction perpendicular to the optical axis of the imaging system, considered in a given space, is generally called a "lateral direction" in said space, and a position measured in a lateral direction is generally called a "lateral position".

According to one or more examples of embodiment, the reference frame of the imaging system in the eye space is defined by the optical axis of the imaging system and the plane of the entrance pupil of the optical system. The origin of the reference frame is the center of the entrance pupil of the imaging system.

According to one or more examples of embodiment, the reference frame of the imaging system in the eye space is defined by the optical axis of the imaging system and a conjugate plane of an imaging plane of the optical system, in the object space of the imaging system. The origin of the reference frame is the center of an object field of the imaging system.

More generally, the reference frame of the imaging system in the eye space may be defined by the optical axis of the imaging system and a predetermined plane, centered on the optical axis, in the object space of the imaging system (eye space).

According to one or more examples of embodiment, an angular separation between the optical axis of the imaging optical element and the optical axis of the imaging system, in the eye space, is smaller than about 20% of the maximum angles of the optical rays propagating through the imaging optical element and/or a lateral offset of said optical axes is smaller than 20% of the maximum dimensions of the optical beams propagating through the imaging optical element.

According to one or more examples of embodiment, the optical axis of the imaging optical element is substantially coincident in the eye space with the optical axis of the imaging system, i.e. an angular separation between the two axes is smaller than about 10%, and advantageously smaller than about 5%, of the maximum angles of the optical rays propagating through the imaging optical element and/or a lateral offset of the two optical axes is smaller than 10%, and advantageously smaller than about 5%, of the maximum dimensions of the optical beams propagating through the imaging optical element. According to one or more examples of embodiment, said at least one image of at least one element located in a plane of the pupil of the eye is formed by said imaging optical element and by at least some of the optical elements forming the imaging system.

According to one or more examples of embodiment, the formation of at least one image comprises formation of images of at least two point or quasi-point virtual secondary sources located in the plane of the pupil of the eye, the images of said at least two virtual sources being offset, in said detection plane, in the direction of sharpness variation. According to one or more examples of embodiment, said point or quasi-point virtual secondary sources are formed by the images in reflection from the cornea of at least two primary light sources, said two primary sources being configured to illuminate the cornea with illuminating beams the projections of which in a plane containing said optical axis of the imaging optical element and the normal to the detection plane make an angle comprised between about 20° and about 180°, and advantageously between about 30° and about 80°.

For example, the primary sources comprise light-emitting diodes (LEDs) or the exits of optical fibers the entrances of which are illuminated by one or more light sources. According to one or more examples of embodiment, the emission spectral band of the primary sources is in the near infrared, and for example comprised between about 700 nm and about 1100 nm, and advantageously comprised between about 800 nm and about 1000 nm.

According to one or more examples of embodiment, the formation of at least one image comprises imaging a natural structural element of the pupil of the eye, a structural element of the iris for example.

The analysis of a state of focus of said at least one image in at least two regions of the detection plane, which analysis is also referred to as the sharpness analysis in the present description, generally comprises determination of one or more parameters of a nature to allow the state of focus of said at least one image in said at least two regions to be measured.

For example, in the case of an image of a structural element of the pupil of the eye, the analysis of the state of focus may comprise, according to one or more examples of embodiment, determination of a sharpness parameter of the image in at least two different regions of the image, said regions lying in the direction of sharpness variation. A sharpness parameter is for example determined by means of a known mathematical processing operation, and for example by applying a Sobel filter or any other algorithm used for the analysis of sharpness, for example known algorithms used in autofocus imaging systems. To increase the robustness of the determination of the axial position of the pupil of the eye, the sharpness analysis may be carried out on the whole of an image cut out into regions corresponding to different positions in the direction of sharpness variation.

In the case of an image of a structural element of the pupil of the eye, the determination of the central position of the pupil of the eye may comprise a measurement of the position of the center of the pupil using a known pupil-detecting method.

In the case of formation of images of at least two point or quasi-point virtual secondary sources located in the plane of the pupil of the eye, said images being offset in the direction of sharpness variation, the analysis of the state of focus may comprise, according to one or more examples of embodiment, determination of one or more parameters characterizing the position and a dimension of said images. These parameters for example comprise non-limitingly: the position of the center of each of said images; a dimension of each of said images, such as for example a diameter, a radius or an average value of the diameter or radius; or a parameter related to the dimension of each of said images, for example a measurement of the average intensity or of the maximum intensity of each of said images. It will be noted that intensity parameters, since they are dependent on the power of the primary sources, are less suitable.

According to one or more examples of embodiment, the method according to the first aspect further comprises a prior step of calibration, said calibration comprising determination of a law giving said axial and lateral positions of the pupil of the eye in the reference frame of the imaging system as a function of said state of focus of said at least one image in said at least two regions of the detection plane.

Thus, according to one or more examples of embodiment, said calibration law may comprise determination of a law giving said axial and lateral positions of the pupil of the eye in the reference frame of the imaging system as a function of a determined sharpness parameter, for example maximum sharpness, in the sharpness-analysis direction. In the case of formation of images of secondary sources, said calibration law may comprise determination of a law giving said axial and lateral positions of the pupil of the eye in the reference frame of the imaging system as a function of parameters characterizing positions and/or dimensions of the images.

The applicant has shown that an alignment-controlling method according to the first aspect, implementing an analysis of a state of focus of at least one image in an inclined detection plane, allows a robust and automatic determination of the lateral and axial position of the pupil of the eye in a given reference frame of the imaging system. According to one or more examples of embodiment, an angle of inclination of the detection plane defined between a direction normal to the detection plane and the optical axis of the imaging optical element is comprised between about 2° and about 30°, and advantageously between about 5° and about 15°. The applicant has shown that such an angle of inclination of the detection plane allows a good compromise to be achieved in respect of the determination of the lateral and axial positions of the pupil of the eye.

According to one or more examples of embodiment, the method according to the first aspect further comprises lateral centering and/or axial centering of the pupil of the eye with respect to said point of origin of the reference frame of the imaging system, on the basis of said previously determined lateral and axial positions of the pupil of the eye. Thus, the lateral and axial positions of the pupil of the eye are first determined, then centering of the pupil of the eye is carried out.

For example, the axial and/or lateral centering of the pupil of the eye is carried out by moving all or part of the ophthalmological imaging device or by moving a rest to which the patient's head is securely fastened.

According to one or more examples of embodiment, the method according to the first aspect further comprises iterative and continuous centering comprising a succession of partial corrections of the measured offsets of the pupil of the eye; such iterative and continuous centering allows the stability of the centering of the pupil of the eye to be improved. In each iteration, the centering may comprise partial lateral and/or axial centering of the pupil of the eye comprising making a correction of between about 40% and about 60%, and for example of about 50%, of the previously determined lateral and axial offsets of the pupil of the eye. The lateral and/or axial offsets are defined by the lateral and/or axial positions of the pupil of the eye, respectively, said positions being measured with respect to the point of origin of the reference frame. The method for controlling alignment of the eye may thus be reiterated based on new and partially corrected positions of the pupil of the eye.

According to one or more examples of embodiment, in the case of formation of images of at least two point or quasi-point virtual secondary sources located in the plane of the pupil of the eye, the images of said at least two virtual sources being offset in the direction of sharpness variation, the method according to the first aspect further comprises lateral centering of the pupil of the eye with respect to said point of origin of the reference frame of the imaging system, on the basis of the determined lateral position of the pupil of the eye, then analyzing the state of focus after said lateral centering.

Specifically, the applicant has shown that, in this case, the determination of the axial position of the pupil of the eye depends on the lateral position of the pupil of the eye. It is thus possible either to correct the lateral position of the pupil of the eye before carrying out the analysis of the state of focus, or to take into account both the state of focus and the lateral position of the pupil of the eye when determining the axial position of the pupil of the eye.

According to a second aspect, the present description relates to a system for controlling alignment of the eye in an ophthalmological imaging device comprising an imaging system with a given optical axis, the system for controlling alignment of the eye comprising:

an imaging optical element having a given optical axis and configured to form an image of at least one element (115b, 116b) located in a plane of the pupil of the eye;

an image-acquiring device comprising a two-dimensional detection plane, said acquiring device being configured to acquire said at least one image of said at least one element located in the plane of the pupil of the eye, said detection plane being inclined such that a normal to the detection plane makes a non-zero angle to said optical axis of the imaging optical element;

a control unit configured to determine a lateral position of the pupil of the eye with respect to a point of origin of a reference frame of the imaging system, on the basis of the position of said at least one image in said detection plane;

analyze a state of focus of said at least one image in at least two regions of the detection plane, said regions being arranged in a direction of sharpness variation, said direction of sharpness variation being defined by the intersection of the detection plane with a plane formed by a normal to the detection plane and said optical axis of the imaging optical element;

determine an axial position of the pupil of the eye with respect to said point of origin of the reference frame of the imaging system, on the basis of said analysis of the state of focus.

According to one or more examples of embodiment, said optical axis of the imaging optical element is substantially coincident in the eye space with said optical axis of the imaging system.

According to one or more examples of embodiment, said at least one element located in a plane of the pupil of the eye comprises at least two point or quasi-point virtual secondary sources located in the plane of the pupil of the eye, the images of said at least two virtual sources being offset, in said detection plane, in the direction of sharpness variation. According to one or more examples of embodiment, the system according to the second aspect further comprises at least two primary light sources, said two primary sources being configured to illuminate the cornea with illuminating beams the projections of which in a plane containing said optical axis of the imaging optical element and the normal to the detection plane make an angle comprised between about 20° and about 180°, said point or quasi-point virtual secondary sources resulting from the image in reflection from the cornea of said at least two primary sources.

According to a third aspect, the present description relates to an ophthalmological imaging device comprising an imaging system with a given optical axis and a system for controlling alignment of the eye according to the second aspect.

According to one or more examples of embodiment, said ophthalmological imaging device is a device for imaging a posterior segment of the eye (e.g. the retina), for example an OCT device for capturing tomographic images of posterior segments (e.g. retina) of the eye, a fundus camera, a scanning laser ophthalmoscope (SLO) for capturing images of the fundus by scanning a laser beam using a confocal optical system, etc.

According to one or more examples of embodiment, said ophthalmological imaging device is a device for imaging an anterior segment of the eye (e.g. cornea), for example an OCT device, a keratometer, a slit lamp, etc.

BRIEF DESCRIPTION OF THE FIGURES

Other advantages and features of the invention will become apparent on reading the description, which is illustrated by the following figures.

DETAILED DESCRIPTION OF THE INVENTION

Figure 1A:
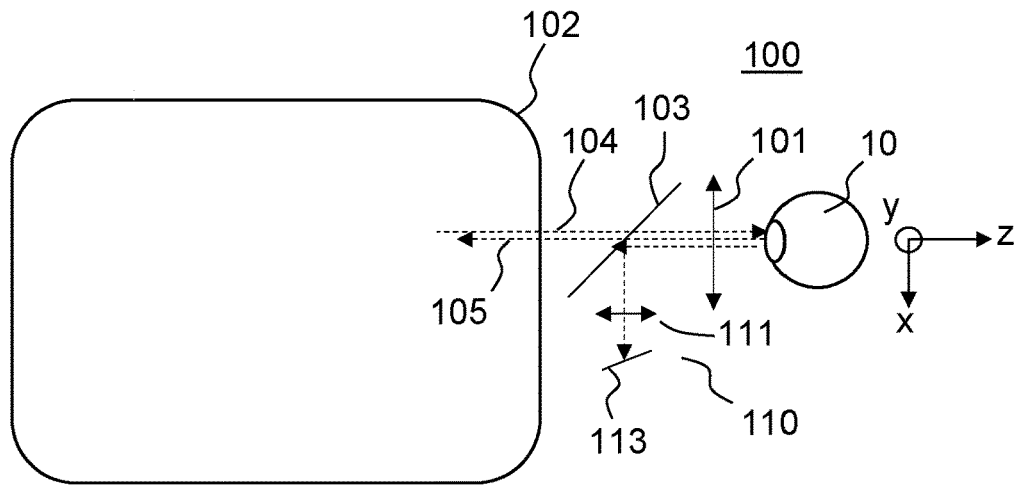
FIG. 1A, shows a simplified schematic illustrating an ophthalmological imaging device equipped with one example of a system for controlling alignment of the eye according to the present description.

In the figures, the elements have not been shown to scale for better legibility. FIG. 1A shows a simplified schematic illustrating one example of an ophthalmological imaging device 100 equipped with a system 110 for controlling alignment of the eye according to the present description and FIG. 1B shows a schematic illustrating one example of such a system for controlling alignment of the eye.

The ophthalmological imaging device 100 generally comprises an imaging system 101 with an optical axis $\Delta_1$ (FIG. 1B), which in the figures has been shown along the z-axis of a coordinate system (xyz) defined in the object space of the imaging system, i.e. in the eye space. The ophthalmological imaging device 100 also comprises an illuminating and detecting unit 102 in which an imaging plane (not shown) is found.

The illuminating and detecting unit 102 is specific to each imaging device and is adapted to the part of the eye 10 that it is sought to image—for example an anterior segment of the eye, such as the cornea, or a posterior segment of the eye, such as the retina. It may comprise, in a known manner, and depending on the type of device, optical lenses, mirrors, light sources, one or more detectors, one or more scanning mirrors, an interferometer (case of an OCT device), and/or a spectroscope (case of an OCT device).

Figure 1B:
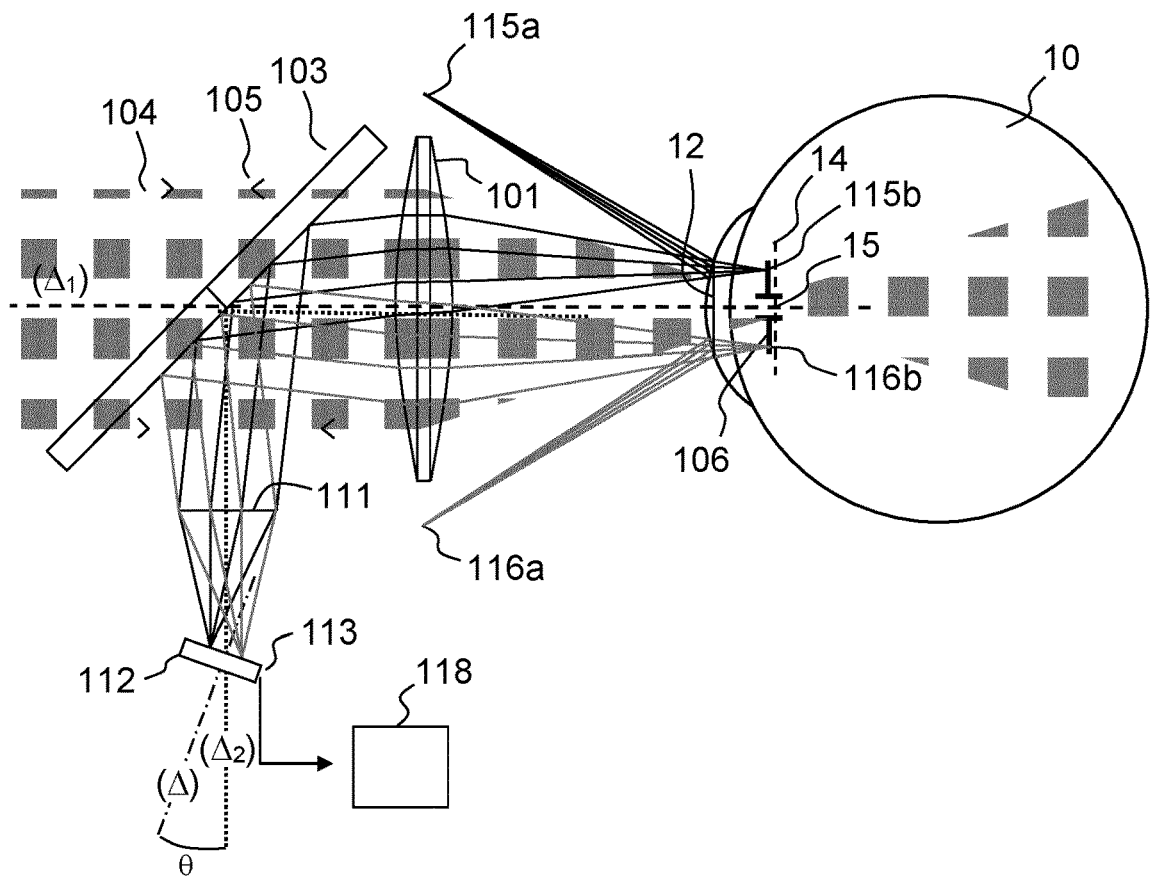
FIG. 1B, shows a simplified schematic illustrating one example of a system for controlling alignment of the eye according to the present description.

For the sake of simplicity, FIGS. 1A and 1B show only one illuminating beam 104, this beam being used to illuminate the part of the eye that it is sought to image, and one beam 105 backscattered by said part of the eye.

In the example illustrated in FIGS. 1A and 1B, control of the alignment of the pupil 15 of the eye 10 comprises control of the superposition of said pupil 15 with the entrance pupil 106 of the imaging system 101 of the imaging device. Although shown schematically in FIG. 1B by a single objective, the imaging system 101 may comprise one or more refractive or reflective optical elements, all of these optical elements behaving like an equivalent objective of given focal length. By "superposition of the pupils", what is meant is that the plane of the pupil 106 of the imaging system is substantially coincident with the plane 14 of the pupil of the eye and that the centers of the pupils 106, 15 are substantially superposed. This configuration in particular applies in the case of ophthalmological imaging devices configured to image the retina.

The present description is however not limited to this configuration. Generally, control of the alignment of the pupil 15 of the eye 10 will possibly comprise control of the superposition of the center of the pupil 15 of the eye with a point of origin o of a reference frame (o, x, y, z) of the imaging system in the eye space, the reference frame being defined by the optical axis $\Delta_1$ of the imaging system and a predetermined plane located in the object space of the imaging system (eye space) and centered on the optical axis $\Delta_1$. Thus, for example, in the case of a device for imaging an anterior segment of the eye (the cornea for example), for example a keratometer, OCT or device for measuring iridocorneal angle, the reference frame will possibly be defined by the optical axis $\Delta_1$ of the imaging system and an object plane of the imaging system, i.e. a plane optically conjugate with an imaging plane, in the eye space, and centered on the optical axis $\Delta_1$.

The system 110 for controlling the alignment of the pupil 15 of the eye 10 comprises, in the example of FIG. 1B, an imaging optical element 111 with an optical axis $\Delta_2$ that is substantially coincident in the eye space with the optical axis $\Delta_1$ of the imaging system. More generally, an angular separation between the optical axis $\Delta_2$ of the imaging optical element and the optical axis $\Delta_1$ of the imaging system, in the eye space, smaller than about 20% of the maximum angles of the optical rays propagating through the imaging optical element and/or a lateral offset of said optical axes smaller than 20% of the maximum dimensions of the optical beams propagating through the imaging optical element, can be acceptable.

The system 110 further comprises an image-acquiring device 112 with a two-dimensional detection plane 113. According to the present description, the detection plane 113 is inclined about a tilt axis perpendicular to the optical axis of the imaging optical element such that a normal A to the detection plane makes a non-zero angle θ to the optical axis of the imaging optical element. For example, an angle of inclination θ of the detection plane is comprised between about 2° and about 30°, and advantageously between about 5° and about 15°.

Moreover, as will be described in more detail below, the acquiring device 112 is configured to acquire at least one image of at least one element located in a plane of the pupil 15 of the eye, said at least one image being formed by the imaging optical element 111. In the example illustrated in FIG. 1B, said acquisition of at least one image comprises acquisition of images of virtual secondary sources 115b, 116b, which result from formation of images, in reflection from the cornea 12 of the eye, of primary sources 115a, 116a. In the example illustrated in FIGS. 1A and 1B, the ophthalmological imaging device 100 further comprises a beam-splitting element 103 configured to split the illumination and detection channels of the imaging device on the one hand, and the detection channel of the system 110 for controlling alignment of the pupil on the other hand.

The splitting element 103 for example comprises a semi-reflective optical element, a dichroic optical treatment, a polarization splitter, or an untreated optical surface allowing a specular reflection of 4% per surface.

In the example of FIG. 1B, the beam-splitting element 103 is arranged downstream of the imaging system 101. Thus, said at least one image of at least one element located in a plane of the pupil of the eye is formed on the detection plane 113 of the acquiring device 112 by the imaging optical element 111 and by the imaging system 101.

In other examples of embodiment, the beam-splitting element 103 may be arranged upstream of the imaging system 101 or between optical elements forming the imaging system 101, in which case said at least one image of at least one element located in a plane of the pupil of the eye is formed on the detection plane 113 of the acquiring device 112 only by the imaging optical element 111 or by the imaging optical element 111 and some of the optical elements forming the imaging system 101.

The system 110 for controlling alignment of the eye further comprises a control unit 118 configured to implement steps of alignment-controlling methods according to the present description, on the basis of said at least one image formed on the detection plane 113 of the acquiring device 112, and in this example on the basis of the images of the virtual secondary sources 115b, 116b.

Figure 2:
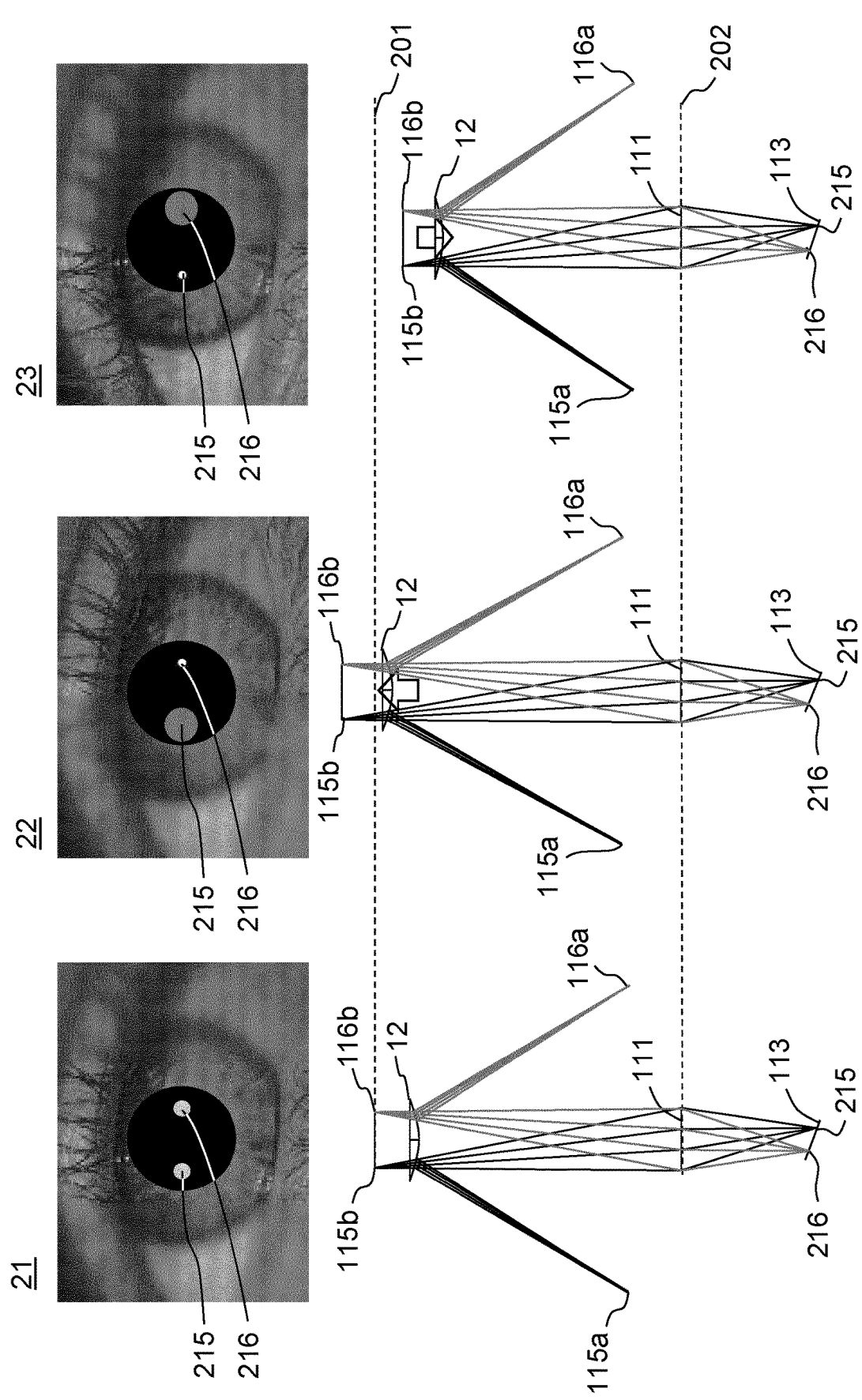
FIG. 2 shows schematics illustrating one example of a method for centering the pupil of the eye axially, according to the present description.
Figure 3:
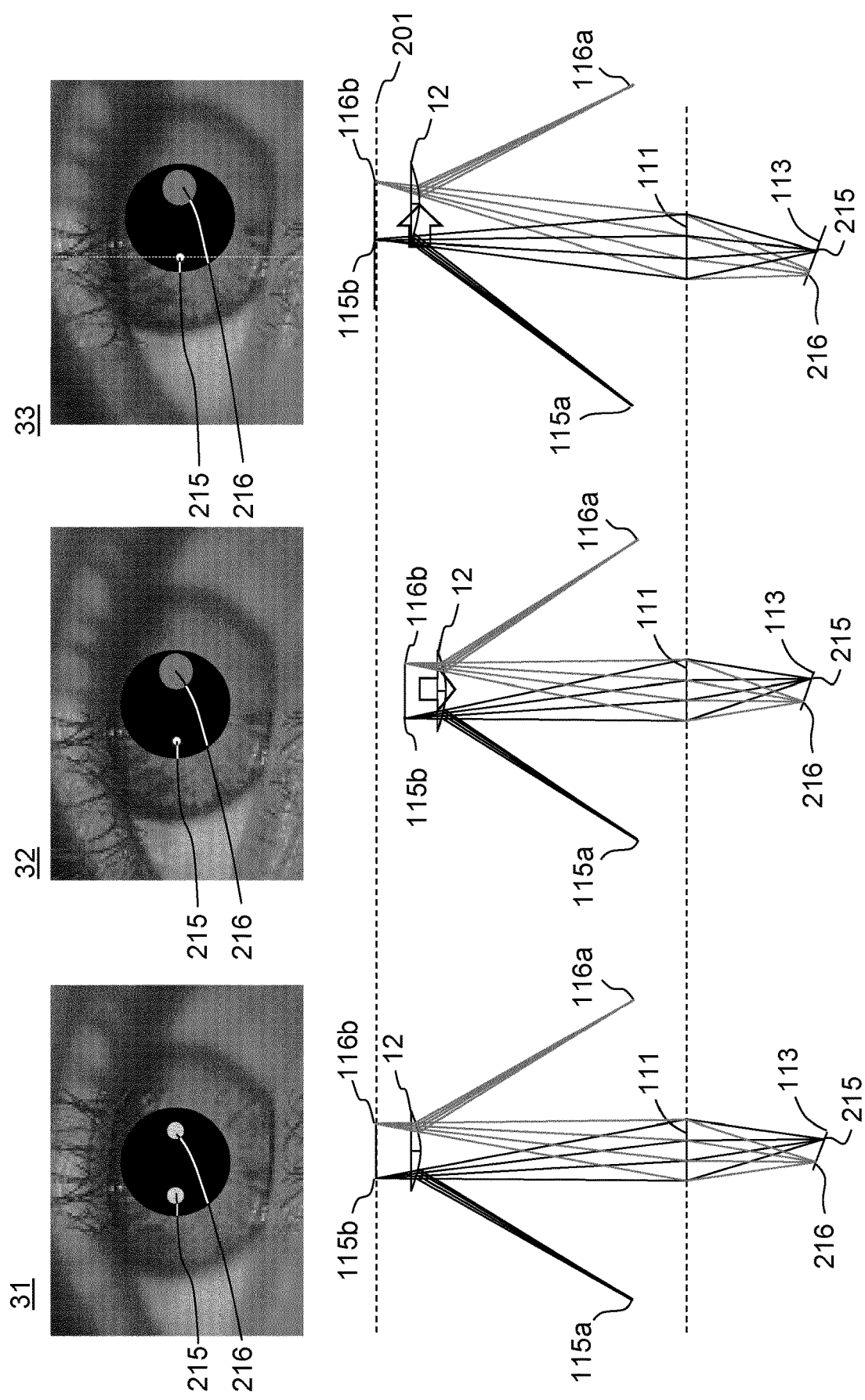
FIG. 3 shows schematics illustrating the link between lateral centering and the axial central of the pupil of the eye, in one example of a method for controlling alignment of the eye according to the present description.
Figure 4:
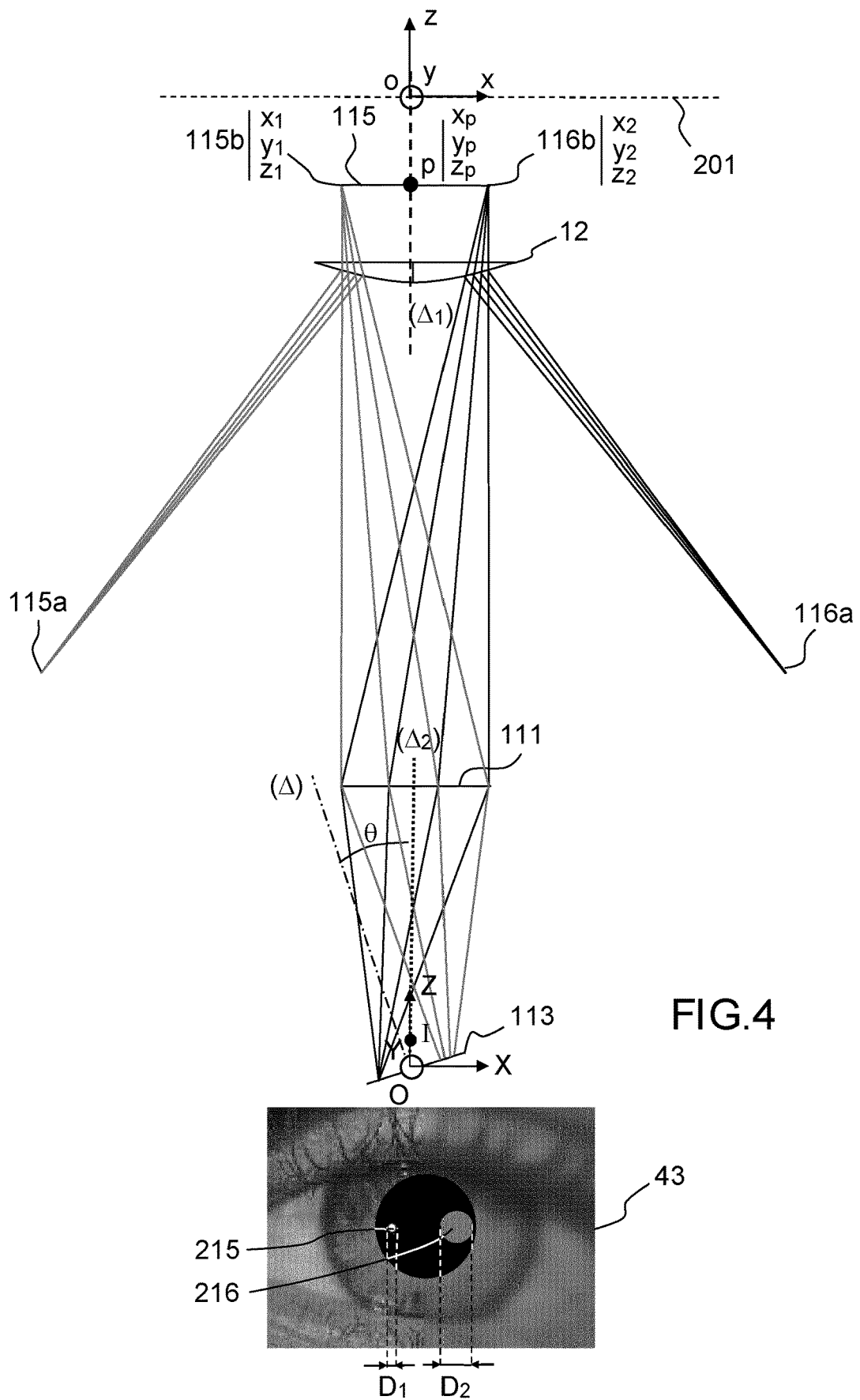
FIG. 4 shows a schematic illustrating one example of determination of the control of the alignment of the eye, in an example comprising the formation of images of two point or quasi-point virtual secondary sources resulting from the image in reflection from the cornea of two primary light sources.

Generally, the control unit 118 referred to in the present description may comprise one or more physical entities, one or more computers for example. When, in the present description, reference is made to steps of computing or processing in particular with a view to carrying out steps of a method, it will be understood that each computing or processing step may be implemented by software, hardware, firmware, microcode, or any suitable combination of these technologies. When software is used, each computing or processing step may be carried out by computer-program instructions or software code. These instructions may be stored or transmitted to a storage medium that is readable by the control unit and/or may be executed by the control unit in order to carry out these computing or processing steps. The control unit 118 may be connected to a user interface (not shown in FIG. 1B) and/or may be connected to elements of the illuminating and detecting unit 102 of the imaging device. FIGS. 2 to 4 illustrate examples of steps of a method for controlling alignment of the eye by means of a system for controlling alignment of the eye according to the present description. In these examples, for the sake of simplicity, only the imaging optical element 111 has been shown.

However, as explained above, said at least one image of at least one element located in a plane of the pupil of the eye may be formed on the detection plane 113 of the acquiring device also by other optical elements, such as the imaging system 101 of the ophthalmological imaging device (FIGS. 1A and 1B), that have not been shown in FIGS. 2 to 4.

In the example illustrated in FIGS. 2 to 4, control of the alignment of the eye comprises control of the superposition of the center of the pupil of the eye with a point of origin o of a reference frame (o, x, y, z) of the imaging system defined by the optical axis $\Delta_1$ of the imaging system and a predetermined plane located in the object space of the imaging system (eye space) and centered on the optical axis $\Delta_1$. Said predetermined plane is referenced 201 in FIGS. 2 to 4. The predetermined plane 201 corresponds for example to the plane of the entrance pupil of the imaging system of the ophthalmological imaging device.

As shown in FIG. 2, the method for controlling alignment of the eye according to the present description comprises formation on the two-dimensional detection plane 113 of at least one image of at least one element located in the plane of the pupil of the eye. In this example, the formation of at least one image comprises formation, by means of the imaging optical element 111, of images 215, 216 of two virtual secondary sources 115b, 116b, which result from formation of images, in reflection from the cornea 12 of the eye, of two primary sources 115a, 116a.

As illustrated in FIG. 4, the detection plane 113 is inclined such that a normal A to the detection plane 113 makes a non-zero angle θ to said optical axis $\Delta_2$ of the imaging optical element 111. Due to this inclination, a deviation of the pupillary plane of the eye 114 from the predetermined plane 201 of the imaging system, will result in an increased difference in sharpness between the images 215, 216 formed by the imaging optical element 111.

Thus, as illustrated in FIG. 2, when the pupillary planes coincide (left-hand schematic), substantially identical images 215, 216 are observed (image of the eye referenced 21). If the pupillary plane of the eye is axially offset from the predetermined plane 201 of the imaging system (schematics in the center and on the right of the figure), a difference in sharpness is observed between the two images 215, 216, as shown in the images of the eye referenced 22, 23.

It is thus possible to determine an axial position of the pupil of the eye with respect to the plane 201 of the pupil of the imaging system, or more generally with respect to a point of origin o of a predetermined reference frame of the imaging system, on the basis of an analysis of the sharpness of the images, or analysis of the state of focus, in a direction of sharpness variation. The direction of sharpness variation is defined by the intersection of the detection plane 113 with a plane formed by the normal A to the detection plane (FIG. 1B) and the optical axis $\Delta_2$ of the imaging optical element.

The analysis of the state of focus of the images 215, 216 comprises, as will be described in more detail below in a specific example, a measurement of parameters characteristic of the positions and dimensions of the images 215, 216, for example the positions of the centers of the images and their diameters.

In practice, in order to be able to accurately determine the axial position of the pupil of the eye on the basis of the sharpness analysis, an angle of inclination of the detection plane 113 comprised between about 2° and about 30°, and advantageously between about 5° and about 15°, will possibly be chosen.

Moreover, in the example, such as illustrated in FIGS. 2 to 4, in which the control of the alignment of the eye comprises formation, by means of the imaging optical element 111, of images of at least two virtual secondary sources that result from the formation of images, in reflection from the cornea 12 of the eye, of at least two primary sources (in this example 115a, 115b), the primary sources will possibly be arranged so that at least two of said primary sources are not aligned in a direction parallel to the tilt axis of the detection plane. Specifically, two primary sources thus aligned would not allow images that are distinct in the direction of sharpness variation to be formed in the detection plane.

Advantageously, said primary sources will possibly be located so that their respective projections in the plane containing the normal to the plane of the detector and the optical axis $\Delta_2$ are on either side of the optical axis $\Delta_2$, respectively, in order to maximize the effect of the sharpness variation.

The applicant has however shown that a difference in sharpness between the images 215, 216 could also result from the center of the pupil of the eye having an incorrect lateral position with respect to the center of the entrance pupil of the imaging system. This effect is illustrated in FIG. 3.

The left-hand and center schematics of FIG. 3 are similar to the left-hand and right-hand schematics of FIG. 2. Thus, the images of the eye referenced 31 and 32 correspond to a case where the pupil of the eye is superposed with the predetermined plane 201 (for example the plane of the entrance pupil of the imaging system) and to a case where the pupil of the eye is axially offset with respect to the predetermined plane 201.

As may be seen in the right-hand schematic of FIG. 3, an image of the eye, referenced 33, may be obtained that is similar to the image referenced 32, even though the pupil of the eye is indeed in the plane 201 of the entrance pupil of the imaging system. The difference in sharpness between the images 215, 216 in this case corresponds to the pupil of the eye having an incorrect lateral position with respect to the center of the entrance pupil of the imaging system.

Thus, the lateral position of the pupil of the eye in the reference frame is taken into account when determining the axial position of the pupil of the eye in the reference frame of the imaging system.

Thus, in the method for controlling alignment of the eye according to the present description, a lateral position of the pupil of the eye with respect to the center of the imaging pupil, or more generally with respect to a point of origin o of a reference frame (o, x, y, z) of the imaging system, will possibly be determined first, before an axial position of the pupil of the eye with respect to the point of origin o of the reference frame of the imaging system is determined, on the basis of the sharpness analysis and of the lateral position of the pupil of the eye.

In examples of embodiment, the lateral centeredness of the pupil of the eye will possibly be corrected, then the sharpness analysis carried out in order to determine the axial position of the pupil of the eye.

In other examples of embodiment, the lateral and axial positions of the pupil of the eye with respect to the point of origin of the reference frame of the imaging system will possibly be determined simultaneously.

According to examples of embodiment, it will then be possible to correct the measured (lateral and/or axial) offsets of the pupil of the eye with respect to the point of origin of the reference frame, by moving all or part of the imaging device, for example by moving the imaging system or by moving a rest, for example a head-rest system, to which the head of the patient is securely fastened.

According to examples of embodiment, an iterative and continuous correction may be made, the iterative and continuous correction comprising a succession of partial corrections of the measured offsets and allowing the stability of the centering of the pupil of the eye to be improved.

FIG. 4 shows a schematic illustrating an example of determination of the axial and lateral positions of the pupil of the eye with respect to a reference frame (o, x, y, z), in an example comprising formation of images of two point or quasi-point virtual secondary sources 115b, 116b resulting from the image in reflection from the cornea of two primary light sources 115a, 116a.

The reference frame (o, x, y, z) is defined in the object space of the optical system (eye space) by the optical axis $\Delta_1$ of the imaging system, which in this example is collinear with the z-axis of the reference frame, and by a predetermined plane 201 that is located in the object space of the imaging system (eye space) and centered on the optical axis $\Delta_1$. It has been assumed in this example that the primary sources 115a and 116a are arranged in a plane (plane of the figure) containing the normal A to the detection plane and the optical axis $\Delta_2$ of the optical element 111, which is substantially coincident with the optical axis $\Delta_1$ of the imaging system. Moreover, it has been assumed that the primary sources 115a and 116a are arranged symmetrically with respect to the optical axis $\Delta_2$ of the optical element 111. With regard to the implementation of the method, these assumptions are non-limiting, and have been made merely with the intention of providing an analytical illustration of the calculation of the lateral and axial positions of the pupil of the eye, under simplifying assumptions.

Moreover, in FIG. 4, only the optical element 111 has been shown as being used to form the images of the secondary sources 115b and 116b. However, in practice, the images of the secondary sources 115b and 116b may be formed by the optical element 111 and all or some of the optical system 101 of the ophthalmological imaging device.

In the reference frame (o, x, y, z), the images 115b and 116b of the primary sources 115a and 116a formed in reflection from the cornea 12 of the eye, form virtual secondary sources the coordinates of which are $x_1, y_1, z_1$ and $x_2, y_2, z_2$, respectively. The coordinates of the center p of the pupil of the eye are denoted $x_p, y_p, z_p$.

As illustrated in the image referenced 43, the images 215, 216 of the virtual secondary sources 115b and 116b on inclined detection plane 113, which images are produced by the optical element 111, which is of magnification $\gamma$, have diameters $D_1, D_2$.

The lateral position (along the x-axis) of the center of the pupil of the eye, in the reference frame (o, x, y, z) may be determined by the lateral positions of the centers of the images 215, 216 formed on the plane of detection. More precisely, in this example and under the assumptions given above, $x_p=(x_1+x_2)/2$, $y_p=y_1=y_2$, $z_p=z_1=z_2$.

The positions of the image of the eye in the image space of the imaging optical element 111 are related to the positions of the image of the eye in the object space by the transverse magnification $\gamma$ of the imaging optical element and the axial magnification $\gamma^2$. It is therefore possible to reason equivalently in the object space or the image space. More precisely, in the image space of the imaging optical element, the coordinates of the centers of the images 215, 216 of the sources are denoted $X_1, Y_1, Z_1$ and $X_2, Y_2, Z$, with $X_1=\gamma x_1$, $X_2=\gamma x_2$, $Y_1=Y_2=Y=\gamma y$, $Z_1=Z_2=Z=\gamma^2 z$.

On the detection plane 113, which makes an angle $\theta$ to the normal, the positions $X'_1, X'_2, Y'_1, Y'_2$ of the images 215, 216 of the sources are measured (image referenced 43). $Y'_1=Y'_2=Y'$. Therefrom, $x_p$ et $y_p$ are deduced using $x_1=X_1/\gamma=\cos\theta X'_1/\gamma$, $x_2=\cos g$, $X'_2/y$, $x_p=(x_1 x_2)/2$, $y_p=Y'/\gamma$.

The axial position $Z_p$ of the pupil of the eye in the reference frame (o, x, y, z) remains to be determined (on the basis of the magnification $\gamma$ of the optical element 111, of the lateral position of the center of the pupil of the eye in the reference frame (o, x, y, z) and of the respective diameters of the images 215, 216).

In the image space, the image of the center p of the pupil of the eye is denoted I and the coordinates of I in an image coordinate system (O, X, Y, Z) are denoted Xi, Yi, Zi. For the sake of simplicity, it has been assumed that the center O of the image coordinate system and the center of the detection plane 113 coincide.

In the case of two virtual sources 115b, 116b each offset from the x-axis by an identical amount, their images are, under the approximation of geometrical optics, shifted with respect to I along X by an identical amount d. Their respective coordinates are Xi−d, Yi, Zi and Xi+d, Yi, Zi.

Assuming paraxial rays (equivalent to assuming the exit pupil of the imaging optical element 111 is located at infinity) and considering an imaging optical element 111 of numerical aperture N and a small sensor angle θ, the diameters D1 and D2 of the source images on the inclined detection plane 213 are:

$$D1 = \frac{1}{N}|z_i - \theta(x_i - d)| \quad \text{[MATH 1]}$$

$$D2 = \frac{1}{N}|z_i - \theta(x_i + d)| \quad \text{[MATH 2]}$$

It may be shown with the above equations that, with measurement of the positions and diameters D1, D2 of the images 215, 216 of the sources 115b, 116b on the inclined detection plane, it is possible to uniquely calculate the position of the image I of the center of the pupil. The position of the pupil of the eye in the reference frame (o, x, y, z) of the object space may be deduced therefrom.

Those skilled in the art will be able to generalize the above calculation under simplifying assumptions to other more general cases taking into account, for example, an offset between the secondary sources 115b and 116b, an exit pupil of the optical element imaging 111 at a finite distance, a larger angle θ, etc.

Moreover, for a given geometry of the system for controlling alignment, a theoretical or experimental calibration of the system will possibly be carried out with a view to determining the axial and lateral positions of the pupil of the eye. The calibration will possibly for example comprise determination of a law that gives, depending on the positions and diameters of the images 215, 216 of the secondary sources 115b, 116b, the lateral and axial positions of the pupil of the eye. This law is established by determining, beforehand, for lateral and axial positions of the pupil of the eye, the positions and diameters of the images 215, 216.

Moreover, the method for controlling alignment of the pupil of the eye has been described in a configuration in which two images 215, 216 are formed on the detection plane, said images being optical conjugates, formed by the optical imaging element 111, of two virtual secondary sources 115b, 116b, which result from the formation of images, in reflection from the cornea 12 of the eye, of two primary sources 115a, 116a.

However, the method for controlling alignment of the pupil of the eye according to the present description may be implemented with other images formed on the inclined detection plane 113.

For example, 4 primary sources will possibly be used instead of 2, these being arranged, for example, in a square, in order to obtain redundancy and robustness in the determination of the lateral and axial positions of the pupil of the eye.

Figure 5:
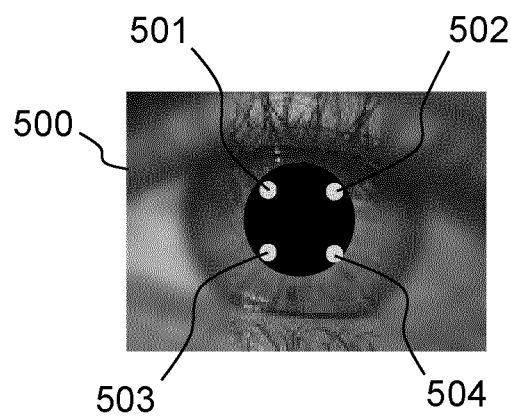
FIG. 5 illustrates the formation of images of four point or quasi-point virtual secondary sources resulting from the image in reflection from the cornea of four primary light sources, in one example of control of alignment of the eye according to the present description.

FIG. 5 thus illustrates an image of the eye 500 on the inclined detection plane, with 4 images 501-504 of secondary sources.

It is also possible to use, instead of primary sources, structural elements naturally present in the plane of the pupil of the eye, and for example details of the structure of the iris of the eye the sharpness of which will vary in the direction of sharpness, depending on the position of the pupil of the eye with respect to the point of origin of the reference frame of the imaging system.

In this case, the sharpness analysis, or analysis of the state of focus, may comprise determination of a sharpness parameter of the image in at least two different regions of the image, said regions lying in the direction of sharpness variation. A sharpness parameter is for example determined by means of a known mathematical processing operation, and for example by applying a Sobel filter or any other algorithm used for the analysis of sharpness, for example known algorithms used in autofocus imaging systems.

Advantageously, the variation in a sharpness parameter in the direction of sharpness variation will possibly be measured, the position, in the direction of sharpness variation, corresponding to the maximum sharpness determined and the axial position of the eye deduced therefrom.

Although described through a certain number of examples of embodiment, the methods and devices for controlling alignment of the eye according to the present description comprise various variants, modifications and improvements that will appear obvious to those skilled in the art, and it will be understood that these various variants, modifications and improvements form part of the scope of the invention such as defined by the following claims.

The invention claimed is:

1. A method for controlling alignment of the eye in an ophthalmological imaging device comprising an imaging system with a given optical axis, the method comprising:
   formation, on a two-dimensional detection plane, of at least one image of at least one element located in a plane of the pupil of the eye, by means of an imaging optical element having a given optical axis, said detection plane being inclined such that a normal to the detection plane makes a non-zero angle to said optical axis of the imaging optical element;
   determination of a lateral position of the pupil of the eye with respect to a point of origin of a reference frame of the imaging system in the eye space based on the position of said at least one image in said detection plane;
   analysis of a state of focus of said at least one image in at least two regions of the detection plane, said regions being arranged in a direction of sharpness variation defined by the intersection of the detection plane with a plane formed by a normal to the detection plane and said optical axis of the imaging optical element;
   determination of an axial position of the pupil of the eye with respect to said point of origin of the reference frame of the imaging system based on said analysis of the state of focus.

2. The method for controlling alignment as claimed in claim 1, wherein the formation of at least one image comprises formation of images of at least two point or quasi-point virtual secondary sources located in the plane of the pupil of the eye, the images of said at least two virtual sources being offset, in said detection plane, in the direction of sharpness variation.

3. The method as claimed in claim 2, wherein said point or quasi-point secondary virtual sources are formed by the images in reflection from the cornea of at least two primary light sources, said two primary sources being configured to illuminate the cornea with illuminating beams, the projections of which make an angle comprised between about 20° and about 180° in a plane containing said optical axis of the imaging optical element and the normal to the detection plane.

4. The method as claimed in claim 2, wherein the axial position of the pupil of the eye with respect to said point of origin of the reference frame of the imaging system is further determined based on the lateral position of the pupil of the eye.

5. The method as claimed in claim 1, wherein said optical axis of the imaging optical element is coincident in the eye space with the optical axis of the imaging system.

6. The method as claimed in claim 1, further comprising lateral and/or axial centering of the pupil of the eye with respect to said point of origin of the reference frame of the imaging system based on the determination of said lateral position of the pupil of the eye and/or of the axial position of the pupil of the eye, respectively.

7. The method as claimed in claim 1, further comprising a prior step of calibration, said calibration comprising determination of a law giving said axial and lateral positions of the pupil of the eye in the reference frame of the imaging system as a function of said state of focus of said at least one image in said at least two regions of the detection plane.

8. A system for controlling alignment of the eye in an ophthalmological imaging device comprising an imaging system with an imaging plane and a given optical axis, said system for controlling alignment of the eye comprising:
an imaging optical element having a given optical axis and configured to form an image of at least one element located in a plane of the pupil of the eye;
an image-acquiring device comprising a two-dimensional detection plane, said acquiring device being configured to acquire said at least one image of said at least one element, said detection plane being inclined such that a normal to the detection plane makes a non-zero angle to said optical axis of the imaging optical element;
a control unit configured to:
determine a lateral position of the pupil of the eye with respect to a point of origin of a reference frame of the imaging system based on the position of said at least one image in said detection plane;
analyze a state of focus of said at least one image in at least two regions of the detection plane, said regions being arranged in a direction of sharpness variation defined by the intersection of the detection plane with a plane formed by a normal to the detection plane and said optical axis of the imaging optical element;
determine an axial position of the pupil of the eye with respect to said point of origin of the reference frame of the imaging system based on said analysis of the state of focus.

9. The system as claimed in claim 8, wherein said optical axis of the imaging optical element is coincident in the eye space with said optical axis of the imaging system.

10. The system as claimed in claim 8, wherein said at least one element located in a plane of the pupil of the eye comprises at least two point or quasi-point virtual secondary sources located in the plane of the pupil of the eye, the images of said at least two virtual sources being offset, in said detection plane, in the direction of sharpness variation.

11. The system as claimed in claim 10, further comprising at least two primary light sources, said two primary sources being configured to illuminate the cornea with illuminating beams, the projections of which make an angle comprised between about 20° and about 180° in a plane containing said optical axis of the imaging optical element and the normal to the detection plane, said point or quasi-point virtual secondary sources being formed by the images in reflection from the cornea of said at least two primary sources.

12. An ophthalmological imaging device comprising an imaging system with a given optical axis and a system for controlling alignment of the pupil of the eye, as claimed in claim 8.

13. The ophthalmological imaging device as claimed in claim 12, further comprising means for centering the pupil of the eye laterally and/or axially with respect to said point of origin of the reference frame of the imaging system based on the determination of said lateral position of the pupil of the eye and/or of the axial position of the pupil of the eye, respectively.

* * * * *